[12] United States Patent
Smith

(10) Patent No.: US 7,788,899 B2
(45) Date of Patent: Sep. 7, 2010

(54) FIXED NOZZLE THRUST AUGMENTATION SYSTEM

(75) Inventor: Jesse Walter Smith, Seneca, SC (US)

(73) Assignee: United Technologies Corporation, Hartford, CT (US)

( * ) Notice: Subject to any disclaimer, the term of this patent is extended or adjusted under 35 U.S.C. 154(b) by 854 days.

(21) Appl. No.: 11/321,222

(22) Filed: Dec. 29, 2005

(65) Prior Publication Data

US 2007/0151228 A1    Jul. 5, 2007

(51) Int. Cl.
    *F02K 3/02*    (2006.01)
(52) U.S. Cl. ...................... 60/226.1; 60/770
(58) Field of Classification Search ............... 60/226.1, 60/262, 263, 761, 762, 765, 766, 770, 39.5
    See application file for complete search history.

(56) References Cited

U.S. PATENT DOCUMENTS

| 2,978,865 | A | * | 4/1961 | Pierce ........................ 60/762 |
| 3,048,376 | A | * | 8/1962 | Howald et al. .............. 366/262 |
| 3,974,646 | A | * | 8/1976 | Markowski et al. ........... 60/737 |
| 4,232,515 | A | | 11/1980 | Brown |
| 4,961,312 | A | * | 10/1990 | Simmons ..................... 60/204 |
| 5,056,307 | A | * | 10/1991 | Liang ........................ 60/226.1 |
| 5,406,787 | A | | 4/1995 | Terrier |
| 5,664,415 | A | | 9/1997 | Terrier |
| 5,813,221 | A | * | 9/1998 | Geiser et al. ................. 60/762 |
| 2006/0032231 | A1 | * | 2/2006 | Andersson et al. ........... 60/765 |
| 2007/0028621 | A1 | * | 2/2007 | Muldoon et al. .............. 60/761 |

FOREIGN PATENT DOCUMENTS

GB    2350649 A    * 12/2000

OTHER PUBLICATIONS

Article by The Air Force Research Lab, Accomplishment Report, "Propulsion Directorate Oct. 1999," http://www.afrl.afmil/accomprpt_index.asp.

* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

A thrust augmentation system for a mixed exhaust turbofan engine comprises an augmentation duct, a combustion system and a fixed area exhaust nozzle. The augmentation duct receives primary and secondary air of the turbofan engine and is positioned co-axially with an exhaust case of the turbofan engine. The combustion system increases the thrust produced by the mixed exhaust of the turbofan. The fixed area exhaust nozzle has a throat area larger than that which would maximize the non-augmented thrust.

15 Claims, 3 Drawing Sheets

FIXED NOZZLE THRUST AUGMENTATION SYSTEM

BACKGROUND OF THE INVENTION

This invention relates generally to gas turbine engines. More particularly, the present invention relates to thrust augmentation systems for mixed flow turbofan engines.

Turbofan engines utilize exhaust gases generated by a main turbine engine to rotate an additional turbine for propelling a drive fan. Thus, turbofan engines produce two flows of air used to create thrust: a primary airflow resulting from combustion in the main turbine engine and a secondary airflow accelerated by the drive fan. In mixed flow turbofan engines the primary airflow (hot air) and the secondary airflow (bypass air) are united in an exhaust duct to be simultaneously passed through an exhaust nozzle. The exhaust nozzle further accelerates the mixed flow exhaust.

Additional thrust can be generated in turbofan engines through the use of an augmentation system, also known as an afterburner or re-heater. Augmentation systems further accelerate the mixed flow exhaust utilizing the remaining oxygen in the exhausted air and an injected fuel stream to perform a secondary combustion process. Mixed flow augmentation can be performed in either the primary air or the secondary air streams. Typically, augmenters are used during short periods when auxiliary thrust is necessary, such as during take-off or when performing combat maneuvers such as intercept missions.

In general, augmented turbofan engines must increase the nozzle throat area for augmented operating conditions to prevent fan or low compressor surge, a condition in which a pressure pulse propagates forward into the fan or low pressure compressor, causing instability due to airfoil or endwall stall. Multi-stage augmenters can also be used to modulate fuel flow during augmented operation to reduce de-stabilizing pressure pulses and improve synchronization of augmentor fuel injection and exhaust nozzle area increases. Both of these solutions, however, increase the cost and complexity of the turbine engine.

For some applications, non-augmented mixed flow turbofan engines having fixed exhaust nozzles are desirable due, in part, to their reduced cost and complexity. Thus, for mixed flow turbofan engines, it is the current state of the art to use either a variable exhaust nozzle with augmentation, or a fixed nozzle without augmentation. There is, therefore, a need for a fixed nozzle area augmentation system for mixed flow turbofan engines.

BRIEF SUMMARY OF THE INVENTION

A thrust augmentation system for a mixed exhaust turbofan engine comprises an augmentation duct, a combustion system and a fixed area exhaust nozzle. The augmentation duct receives primary and secondary air of the turbofan engine and is positioned co-axially with an exhaust case of the turbofan engine. The combustion system increases the thrust produced by the mixed exhaust of the turbofan. The fixed area exhaust nozzle has a throat area larger than that which would maximize the non-augmented thrust.

DETAILED DESCRIPTION

Figure 1:
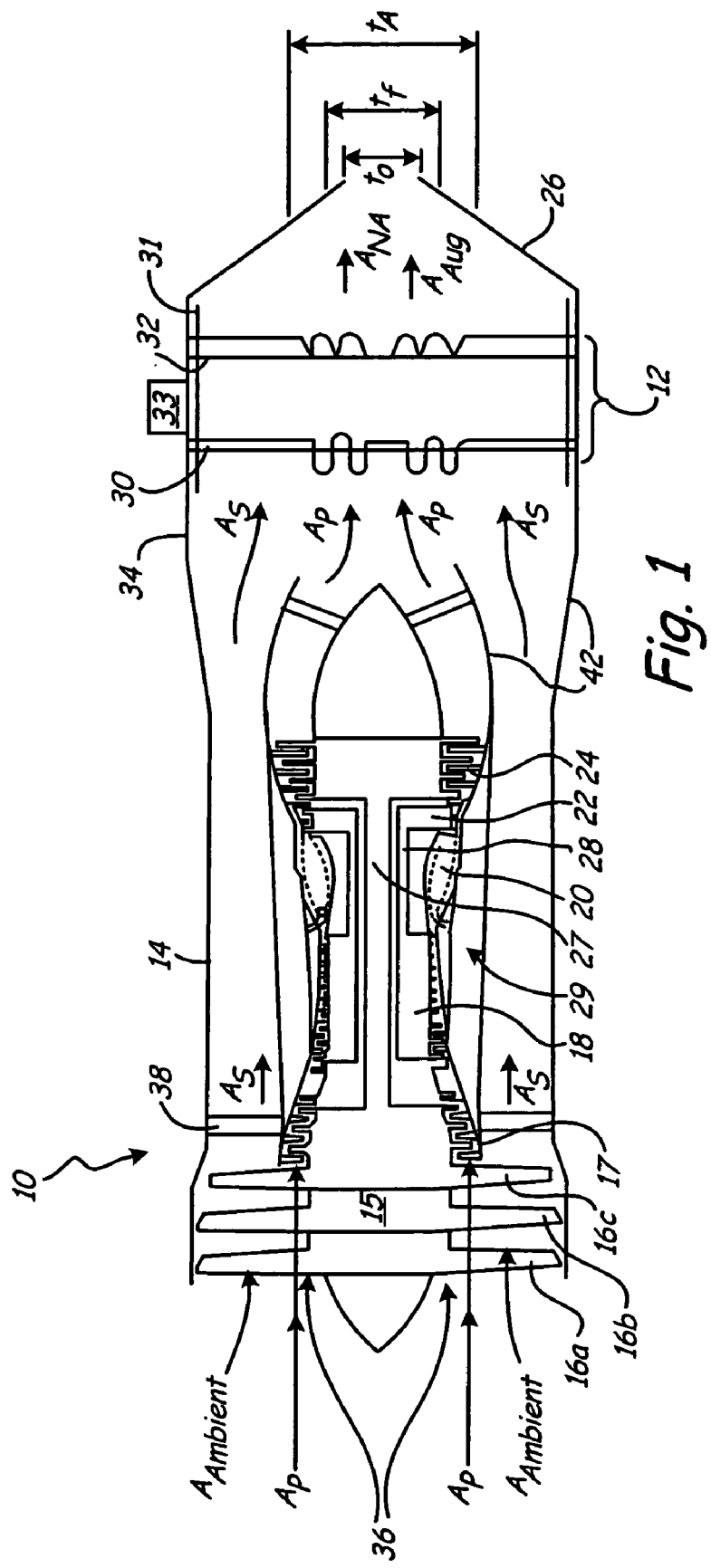
FIG. 1 shows a cross sectional diagram of a mixed flow turbofan engine having an augmentation system of the present invention.

FIG. 1 shows a cross sectional diagram of mixed flow turbofan engine 10 having augmentation system 12 of the present invention. Turbofan engine 10 includes augmentation system 12, fan duct 14, drive fan 15 (including blades 16a-16c), low pressure compressor 17, high pressure compressor 18, combustor 20, high pressure turbine 22, low pressure turbine 24, and exhaust nozzle 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which is the major portion of the gas generator 29 that produces the high energy air stream that is ultimately used to drive low pressure turbine 24 and provide high pressure flow to produce thrust via both the secondary and primary air streams. Augmentation system 12 includes fuel spray bars 30, liner 31, flame holders 32, igniter 33 and augmenter duct 34. Exhaust nozzle 26 has fixed, or non-variable, throat area $t_F$, while the theoretical, maximum-thrust, non-augmented throat area to and the theoretical, maximum-thrust, full-augmented throat area $t_A$ are also shown.

Ambient air $A_{Ambient}$ enters engine 10 at inlet 36 through drive fan 15. Drive fan 15 is rotated by low pressure turbine 24 to accelerate $A_{Ambient}$ thereby producing a major portion of the thrust output of engine 10. Accelerated $A_{Ambient}$ is divided into two streams of air: primary air $A_P$ and secondary air $A_S$. Secondary air $A_S$, also known as bypass air, passes through fan exit guide vanes 38 and into fan duct 14 where it passes on to augmentation section 12. Thus, the principal function of secondary air $A_S$ is the production of thrust from drive fan 15. Primary air $A_P$, also known as hot air, is a stream of air that is directed first into low pressure compressor 17 and then into high pressure compressor 18. The ratio of secondary air $A_S$ to primary air $A_P$, and the amount of thrust produced by drive fan 15, depends on desired design parameters and the selected bypass ratio. FIG. 1 illustrates a dual-axial compressor having low pressure compressor 7 and high pressure compressor 18, referred to as a fan-low-high configuration. Low pressure compressor 17 and high pressure compressor 18 operate independently, as they are driven by different drive shafts, but function in tandem to sequentially increase the pressure and reduce the volume of primary air $A_P$. In other embodiments, which are referred to as fan-high configurations, only drive fan 15 and high pressure compressor 18 are used. Pressurized primary air $A_P$ is then passed into combustor 20 where it is mixed with a fuel supply and ignited to produce the high energy gases used to turn high pressure turbine 22 and low pressure turbine 24. Turbine 22 drives compressor 18 with shaft 28, while turbine 24 drives compressor 17 and drive fan 15 with shaft 27. Combusted primary air $A_P$ and secondary air $A_S$ are passed into augmenter duct 34. Augmentation can be conducted in primary air $A_P$, secondary air $A_S$ or both. Duct section 42 provides the desired flow velocity for combustion in the augmentor for both primary and secondary air streams. In many embodiments this duct section will act as a diffuser to slow the velocity of air entering the combustion process, especially for the primary air stream where velocities leaving the low pressure turbine would be too high for a stable, efficient combustion process.

Primary air $A_P$ and secondary air $A_S$ transition from section 42 into augmentation system 12 through augmenter duct 34. Engine 10 can be operated in non-augmented and augmented modes. In the non-augmented mode, augmenter duct 34 serves as an exhaust duct. In the augmented mode, augmentation system 12 further increases the thrust produced by primary air $A_S$ and/or secondary air $A_S$ for intermittent, situational uses. The total cross sectional area of augmenter duct 34 must be sufficient to ensure that the velocity of exhaust gas following augmentation does not increase to the point that pressure losses are excessive and combustion efficiency is unduly reduced.

In one embodiment of the invention, augmentation system 12 carries out a secondary combustion process in primary air $A_P$ to further increase the velocity and mass of primary air $A_P$. Fuel spray bar 30 injects a stream of fuel into primary air $A_P$, which is ignited with igniter 33. In one embodiment of the invention, augmentation system 12 is to be used in only low altitude applications, such as take off, and the fuel injection and stabilization systems can be further simplified to reduce flame-holder blockage and the associated pressure loss. Also, the use of valves and plumbing needed for fuel injection over a wide range of operating fuel flows can be minimized if augmentation system 12 is to be used only at low altitude levels. Thus, single stage spray bar 30 is used. (In other embodiments, single stage spray rings can be used instead.) In other embodiments, multi-stage spray bars or other fuel injection systems are used to adjust the augmentation process for various altitudes or pressures. The fuel is combusted with oxygen present in the air, thereby further increasing its velocity and mass. Sufficient oxygen remains in primary air $A_P$ after combustion in combustor 20 to sustain additional, augmenting combustion. Flame holder 31 creates local turbulence downstream of fuel spray bar 30, which maintains flame stability. By conducting augmentation in only primary air AP the need for liners and other heat protection equipment is reduced. Since augmentation is conducted in only primary air $A_P$, cooler secondary air $A_S$ serves as a protective layer and prevents heat damage to augmenter duct 34 during the mixing of primary air $A_P$ and secondary air $A_S$. In other embodiments, augmentation system 12 includes augmentation liner 31 and other protective shielding to prevent heat damage to augmentation system 12 and engine 10.

During either augmented or non-augmented operation, exhaust nozzle 26 collects and straightens either augmented air $A_{Aug}$ (the heated primary air $A_P$) or non-augmented air $A_{NA}$, and increases its velocity, thereby providing a final increase in velocity as the exhausted air exits engine 10. In other embodiments of the invention, exhaust nozzle 26 can be non-circular in cross section, such as squared or elliptical, to optimize nozzle system configuration for better integration with aircraft vehicle objectives.

Figure 2:
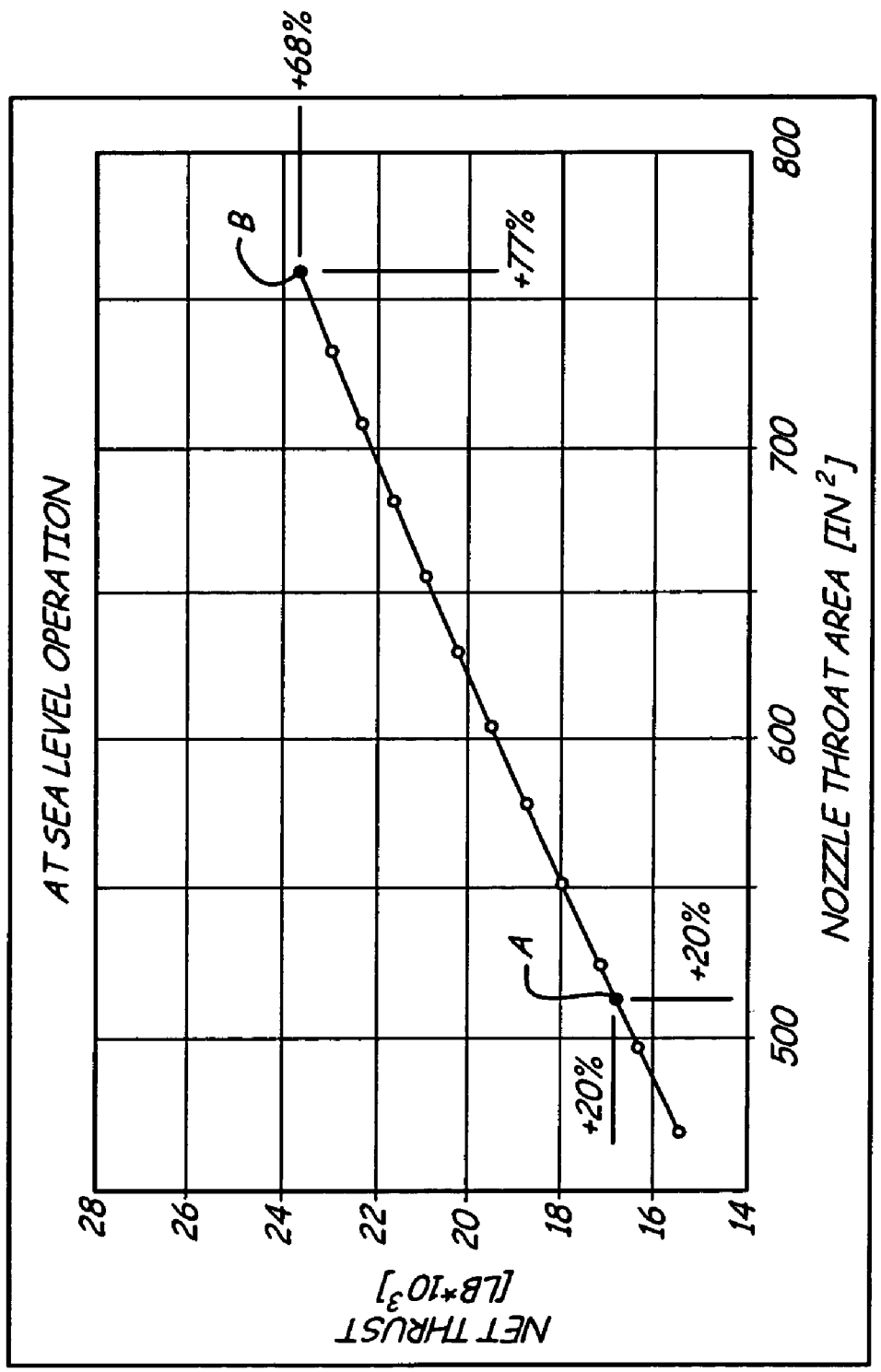
FIG. 2 is a graph showing net thrust gain versus nozzle throat area for a typical augmented, variable nozzle turbofan engine.

FIG. 2 shows a plot of nozzle throat area [in²] versus net thrust [lb] for a typical augmented turbofan engine having a variable throat exhaust nozzle. FIG. 2 was generated based on an engine configuration having a non-augmented thrust of 14043 lb (~62,466.4 N) and a non-augmented nozzle throat area of 428 in² (~2,761.3 cm²). As shown in FIG. 2, increasing thrust with augmentation requires increasingly larger throat areas, as additional volumetric flow capabilities are required. At lower augmentation levels, such as at point A, there is an approximate one-to-one correspondence of throat area to thrust gain. A 20% gain in thrust requires a 20% increase in throat area. However, at high augmentation levels, such as at point B, the throat area must be increased even more to gain more thrust. A 68% gain in thrust requires a 77% increase in throat area. Nonetheless, deriving additional thrust from augmentation requires additional throat area, with more efficient thrust gains being realized at smaller throat area increments.

In a typical augmented turbofan engine having a variable throat exhaust nozzle, the throat area can be set at $t_0$ for maximum thrust at non-augmented operation. Assuming augmentation is used at take-off, the throat area would be largest at take-off, say $t_A$, then decreased $t_0$ to as augmentation ceased, and optimized to, say, $t_f$ as the engine power is reduced to cruising speeds and thrust conditions, in order minimize back pressure and optimize engine performance.

In a typical non-augmented engine having a fixed throat exhaust area, the throat area may be optimized for thrust at high power, e.g. near throat area $t_0$, or for fuel efficiency and/or compression system (e.g. fan 15, low pressure compressor 17, and high pressure compressor 18) stability at cruising speeds, e.g. greater than throat area $t_0$. The throat area may also be a compromise between the optimal area for these two conditions. These settings, however, will not produce the greatest amount of thrust the engine is capable of producing, nor will it operate at optimal fuel efficiency at full throttle or non-cruising operation, because the nozzle throat area is too large. This is shown in FIG. 3.

Figure 3:
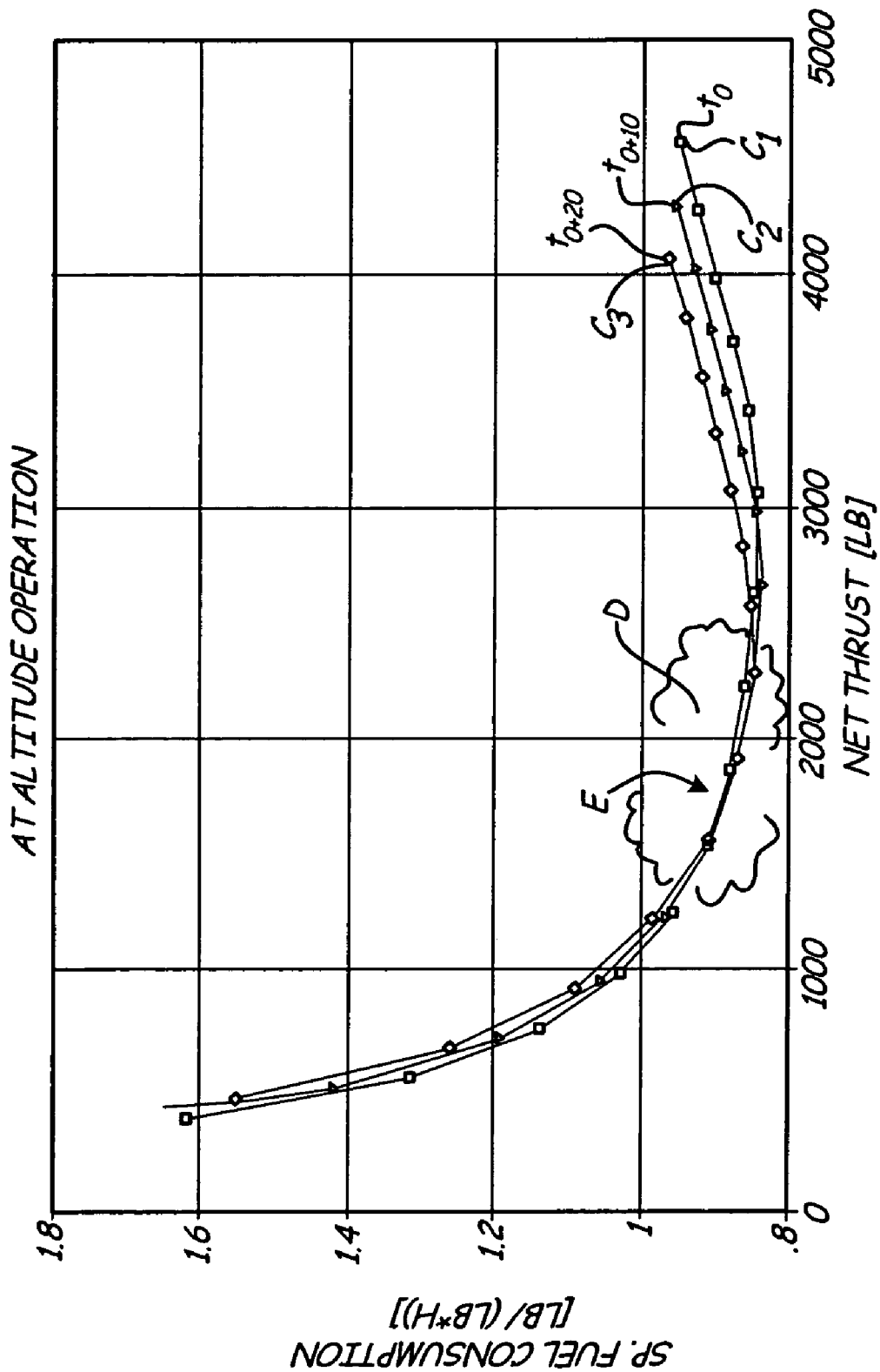
FIG. 3 is a graph showing thrust specific fuel consumption versus net thrust for three nozzle throat areas.

FIG. 3 shows net thrust [lb] plotted against thrust specific fuel consumption [lb/lb*h] for three nozzle throat areas, $t_0$, $t_{0+10}$, $t_{0+20}$ of a non-augmented turbofan engine. Throat areas $t_0$, $t_{0+10}$, $t_{0+20}$ represent alternative non-augmented throat areas for the given engine/aircraft configuration. Thrust specific fuel consumption indicates an engine's fuel consumption in pounds per hour divided by the net thrust and is indicative of an engine's fuel efficiency. As indicated at points $C_1$-$C_3$, having throat area to produces the most thrust for the engine with the best fuel consumption rate. As the throat area is opened up, fuel consumption increases, while thrust goes down.

FIG. 3 also shows that nozzle throat area can sometimes be increased substantially with no penalty in fuel efficiency at cruising speeds. Region D indicates the cruising speed thrust requirements for a given engine/aircraft configuration. The plots for each throat area, $t_0$, $t_{0+10}$, $t_{0+20}$, intersect at the center of region D, near point E, indicating that for each throat area, the thrust specific fuel consumption is nearly identical at this thrust setting. Thus, increased throat area does not adversely affect fuel efficiency at or near the cruising speed thrust requirement. As such, typical fixed nozzle, non-augmented engines utilize a throat area larger than to in order to achieve fuel efficiency at cruising speeds and provide stability margin for the compression system.

Therefore, the throat area of fixed exhaust nozzle 26 in turbofan engine 10 can be selected to maximize nozzle throat area (and total engine thrust when augmented) and to benefit compression system stability, without penalizing cruise fuel efficiency. In a representative embodiment of the present invention, throat area $t_f$ is approximately 20% larger than throat area $t_0$. There are several advantages for choosing such a throat area when implementing augmentation system 12 of the present invention, particularly with respect to thrust gains. One advantage is the 20% increase in realized thrust as compared with a non-augmented turbofan engine. As shown in FIG. 2, having a 20% oversized throat area allows for a 20% increase in thrust with augmentation. Another advantage is the recapture of lost thrust if the non-augmented throat area were oversized. As indicated earlier, non-augmented turbofan engines sometimes utilize throat areas near $t_f$ for optimal fuel efficiency at cruising conditions and for benefits in compression system stability. However, they sacrifice thrust at maximum thrust conditions because, as indicated with points $C_1$-$C_3$ in FIG. 3, the nozzle area is too large. Thus, engine 10 has the additional benefit of gaining the lost thrust in retreating from point $C_1$ to point $C_2$ of FIG. 3. When in the augmented operating condition, engine 10 is operating as if it were a non-augmented engine operating at point $C_1$ in FIG. 3, with maximum thrust and best fuel efficiency, but with a 20% larger throat area.

For best augmented performance, throat area $t_f$ of nozzle 26 is oversized approximately 20%-30% from throat area to that maximized non-augmented thrust. It is desirable to select augmentation near this range to avoid the need for larger nozzle areas that would incur fuel efficiency penalties at cruise thrust as described above. Additionally, with this throat area thrust augmentation system 12 produces a 20-30% thrust increase (FIG. 2) while avoiding any destabilizing increases in the exhaust system pressure. Other benefits of selecting a throat area $t_f$ that is 20%-30% oversized relative to a throat area that maximized non-augmented thrust include the simplified design and construction of augmentation system 12, especially for low altitude augmentation. The need to synchronize fuel injection and modulation with variable nozzle position is eliminated because the selected throat area is consistent with maximum augmented fuel flow. In the present invention, engine 10 always operates at or below a fuel flow rate that maintains compression system stability. In other embodiments, for mission specific operations, where higher surge risks or reduced fuel efficiency are acceptable, it is contemplated altering the size of throat area $t_f$ outside of the 20%-30% range described above. The exact design of augmentation system 12 and throat area $t_f$ vary and are selected based on the particular performance requirements chosen for engine 10.

Although the present invention has been described with reference to preferred embodiments, workers skilled in the art will recognize that changes may be made in form and detail without departing from the spirit and scope of the invention.

The invention claimed is:

1. A thrust augmentation system for a turbofan engine having mixed exhaust, the thrust augmentation system comprising:
    an augmentation duct configured to receive a fixed ratio of primary and secondary air of the turbofan engine during operation of the turbofan engine, the augmentation duct positioned co-axially with and downstream of an exhaust case of the turbofan engine and having a cross-sectional area sized to accommodate unrestricted flow of the primary and secondary air, the primary and secondary air producing non-augmented thrust;
    a combustion system positioned aft of the exhaust duct within the augmentation duct for increasing thrust produced by the mixed exhaust of the turbofan, the combustion system producing augmented thrust; and
    a non-variable area exhaust nozzle for continuously increasing velocity of the mixed exhaust and having a throat area $t_f$ smaller than a minimum cross-sectional area of the augmentation duct and smaller than a throat area $t_A$ required for accommodating flow of the primary and secondary air during generation of a maximum theoretical augmented thrust, the throat area $t_f$ being about 20% to about 30% larger than a throat area $t_0$ required for accommodating flow of the primary and secondary air during generation of a maximum theoretical non-augmented thrust.

2. The thrust augmentation system of claim 1 wherein the combustion system operates to maximize thrust for the throat area $t_f$ of the fixed area exhaust nozzle.

3. The thrust augmentation system of claim 2 wherein the fixed area exhaust nozzle produces fuel efficiency at cruising speeds similar to that of an exhaust nozzle having a throat sized for maximum non-augmented thrust operating conditions.

4. The thrust augmentation system of claim 1 wherein the fixed area exhaust nozzle has a non-circular cross section.

5. The thrust augmentation system of claim 2 wherein the combustion system increases maximum non-augmented thrust about 20% to about 30%.

6. The thrust augmentation system of claim 5 wherein the combustion system increases the thrust such that the nozzle throat area $t_f$ does not induce large pressure increases in the turbofan engine that create stall conditions.

7. The thrust augmentation system of claim 1 wherein the combustion system comprises:
    a fuel injection system;
    an igniter; and
    a flame holder.

8. The thrust augmentation system of claim 7 wherein the fuel injection system comprises a single stage fuel spray bar or spray ring.

9. The thrust augmentation system of claim 7 wherein the fuel injection system is positioned in the primary air.

10. The thrust augmentation system of claim 7 wherein the thrust augmentation system includes an augmentation duct liner for insulating the augmentation duct and controlling drive fan stability.

11. The thrust augmentation system of claim 1 wherein the throat area $t_f$ is smaller than a minimum cross-sectional area of the exhaust case.

12. A thrust augmentation system for a turbofan engine having mixed exhaust of primary air and secondary air, the thrust augmentation system comprising:
    a diffuser section configured to receive a fixed ratio of primary and secondary air from operation of the turbofan engine, the diffuser section configured to decrease velocity of the mixed exhaust, the mixed exhaust producing non-augmented thrust;
    an augmentation duct connected to the gas turbine engine axially downstream of the diffuser section and having an axially constant cross-sectional area sized to not increase velocity of the mixed exhaust;
    an augmentation system disposed aft of the diffuser section, the augmentation system comprising a fuel injection system and a flame holder positioned within the augmentation duct to carry out a combustion process in the mixed exhaust to produce augmented thrust; and
    a non-variable area exhaust nozzle connected to the augmentation duct and having an axially constantly decreasing cross-sectional area culminating in a throat area $t_f$ smaller than a minimum cross-sectional area of the augmentation duct to increase velocity of the mixed exhaust and increase thrust,
    wherein the throat area $t_f$ is sized about 20% to about 30% larger than a throat area $t_0$ required to maximize non-augmented thrust; and
    wherein the augmentation system is configured to produce thrust maximized by the throat area $t_f$.

13. The thrust augmentation system of claim 12 wherein the diffuser section comprises:
    a fan case through which the secondary air passes; and
    an engine case concentrically disposed within the fan case and through which the primary air passes.

14. The thrust augmentation system of claim 13 wherein the throat area $t_f$ is smaller than a minimum cross-sectional area of the fan case.

15. The thrust augmentation system of claim 14 wherein the throat area $t_f$ is smaller than a minimum cross-sectional area of the engine case.

* * * * *